United States Patent [19]
Doi et al.

[11] Patent Number: 5,553,497
[45] Date of Patent: Sep. 10, 1996

[54] GAS FLOW TYPE ANGULAR VELOCITY SENSOR

[75] Inventors: Mizuho Doi; Tomoyuki Nishio; Nobuhiro Fueki, all of Wako, Japan

[73] Assignee: Honda Giken Kogyo Kabushiki Kaisha, Tokyo, Japan

[21] Appl. No.: 390,875

[22] Filed: Feb. 17, 1995

[30] Foreign Application Priority Data

Feb. 23, 1994 [JP] Japan .................................. 6-064318

[51] Int. Cl.$^6$ .................................................... G01P 9/00
[52] U.S. Cl. ................... 73/504.06; 73/204.15; 73/204.26; 73/497
[58] Field of Search .......................... 73/204.15, 204.22, 73/204.26, 497, 504.06; 137/80; 338/22 SD

[56] References Cited

U.S. PATENT DOCUMENTS

| | | | |
|---|---|---|---|
| 3,631,729 | 1/1972 | Moore | 73/516 |
| 3,635,095 | 1/1972 | Schuemann | 73/505 |
| 4,020,699 | 5/1977 | Schaffer | 73/504.06 |
| 4,026,159 | 5/1977 | Isakson et al. | 73/516 LM |
| 4,147,063 | 4/1979 | Bower et al. | 73/504 |
| 4,156,364 | 5/1979 | Hill | 73/194 F |
| 4,254,659 | 3/1981 | Benedetto et al. | 73/516 LM |
| 4,348,900 | 9/1982 | Takahashi et al. | 73/505 |
| 4,407,161 | 10/1983 | Ferrar | 73/505 |
| 4,408,490 | 10/1983 | Takahashi et al. | 73/497 |
| 4,542,650 | 9/1985 | Renken et al. | 73/204 |
| 4,584,878 | 4/1986 | Katsuno | 73/497 |
| 4,592,232 | 6/1986 | Moffatt et al. | 73/505 |
| 4,717,891 | 1/1988 | Ichise et al. | 331/17 |
| 4,930,349 | 6/1990 | Takahashi | 73/504.06 |
| 4,951,507 | 8/1990 | Takahashi | 73/504.06 |
| 5,012,676 | 5/1991 | Takahashi et al. | 73/497 |
| 5,107,707 | 4/1992 | Takahashi et al. | 73/505 |
| 5,270,960 | 12/1993 | Ikegami et al. | 364/571.03 |
| 5,385,046 | 1/1995 | Yamakawa et al. | 73/516 LM |
| 5,438,871 | 8/1995 | Hosoi et al. | 73/504.05 |
| 5,476,820 | 12/1995 | Fueki et al. | 437/250 |

FOREIGN PATENT DOCUMENTS

| | | | |
|---|---|---|---|
| 5-2026 | of 1993 | Japan . | |
| 88/02819 | 4/1988 | WIPO | 73/204.15 |

OTHER PUBLICATIONS

Hosoi et al., U.S. application Ser. No. 08/376,155 filed Jan. 20, 1995.

Shinotuka et al., U.S. application Ser. No. 08/384,910 filed Feb. 7, 1995.

*Primary Examiner*—Hezron E. Williams
*Assistant Examiner*—Christine K. Oda
*Attorney, Agent, or Firm*—Lyon & Lyon

[57] ABSTRACT

A gas flow type angular velocity sensor which is capable of reliably sensing an angular velocity while accurately controlling the working gas flow with temperature compensation by using a pair of heat wires as a gas flow sensor without providing any additional gas flow sensor in the sensor body wherein an angular velocity sensing bridge circuit is provided at its current supply source with a temperature compensating circuit connected in series which temperature compensating circuit is composed of a pair of series or parallel connected resistance elements, one of which is a thermosensitive resistance element disposed in a gas path and the other of which is a reference resistance element disposed outside the gas path.

6 Claims, 5 Drawing Sheets

GAS FLOW TYPE ANGULAR VELOCITY SENSOR

BACKGROUND OF THE INVENTION

The field of the present invention relates to a gas flow type angular velocity sensor which is capable of detecting a deflection of a gas flow in a gas path when an angular velocity acts on the sensor body by sensing a change of resistance in each of paired thermosensitive resistance elements disposed in the gas path.

There has been known such a gas flow type angular velocity sensor for sensing an angular velocity acting on its body, wherein gas is forced by a pump through a nozzle port into a gas path toward a pair of thermosensitive resistance elements (heat wires) arranged at the right and the left in the gas path and a change of differential resistance in the paired heat wires, which is produced when the gas flow is deflected to the left or the right by the action of an angular velocity applied to the sensor body, is detected by an unbalanced output of an angular velocity sensing bridge circuit which includes, in its respective arms, the above-mentioned paired thermosensitive resistance elements and paired reference resistance elements.

This type of angular velocity sensor, however, has a drawback that its detecting accuracy may vary with a change of the flow rate of gas in the gas path because the sensor is designed to determine a deflection of the gas flow by sensing a differential change of resistance in the paired thermosensitive resistances.

Recently, there has also been developed a gas rate sensor of the type which has a body portion composed of a gas path and a pair of heat wires arranged therein and which is manufactured by semiconductor micro-machining on the basis of IC technology. Usually, the sensor uses a small volume of gas in its gas path and its detecting accuracy, therefore, may be greatly affected even by a very small fluctuation of the gas flow.

Accordingly, Japan Laid-Open Patent Publication No. 5-2026 proposes to provide an angular velocity sensor with a flow sensor (additional thermosensitive resistance) in a nozzle portion of the sensor body to detect a flow rate of gas through the nozzle port and to control the operation of a gas injection pump so as to maintain a constant gas flow rate. This solution, however, requires the provision of an additional flow sensor element in the angular velocity sensor body, which complicates the construction of the sensor body.

The sensitivity of the sensor to a change in the gas flow rate may vary with a change in the gas temperature. Therefore, it is also necessary to make a temperature compensation together with the control of the gas flow rate.

SUMMARY OF THE INVENTION

In view of the foregoing, the present invention was made to provide a gas flow type angular velocity sensor which is capable of accurately sensing an angular velocity acting on its body while controlling the gas flow rate by using a pair of heat wires for sensing the angular velocity and the gas flow rate (without providing an additional flow sensor) with temperature compensation and which is featured by an angular velocity detecting bridge circuit provided at its power supply source with a temperature compensating circuit that is connected in series therewith and comprises a series-connected or parallel connected thermosensitive resistance element and reference resistance element.

Figure 1:
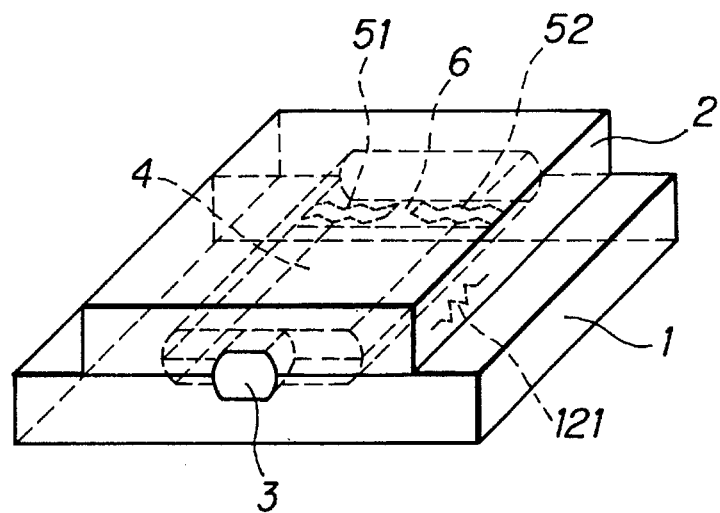
FIG. 1 is a perspective view showing, by way of example, the construction of a body of a gas flow type angular velocity sensor embodying the present invention.

In the drawings, 1 is a lower semiconductor substrate, 2 is an upper semiconductor substrate, 3 is a nozzle hole, 4 is a gas path, 51 and 52 are paired heat wires (thermosensitive resistance elements), 81 and 82 are cold wires (reference resistance elements), 9 is a power supply (constant-current source), 10 is an angular velocity detecting bridge circuit, 11 is an amplifier, 12 is a temperature compensating circuit, 14 is a gas flowrate control bridge circuit and 16 is a miniature pump.

DESCRIPTION OF THE PREFERRED EMBODIMENTS

An embodiment of the present invention will be now described by way of example and with reference to the accompanying drawings.

Figure 2:
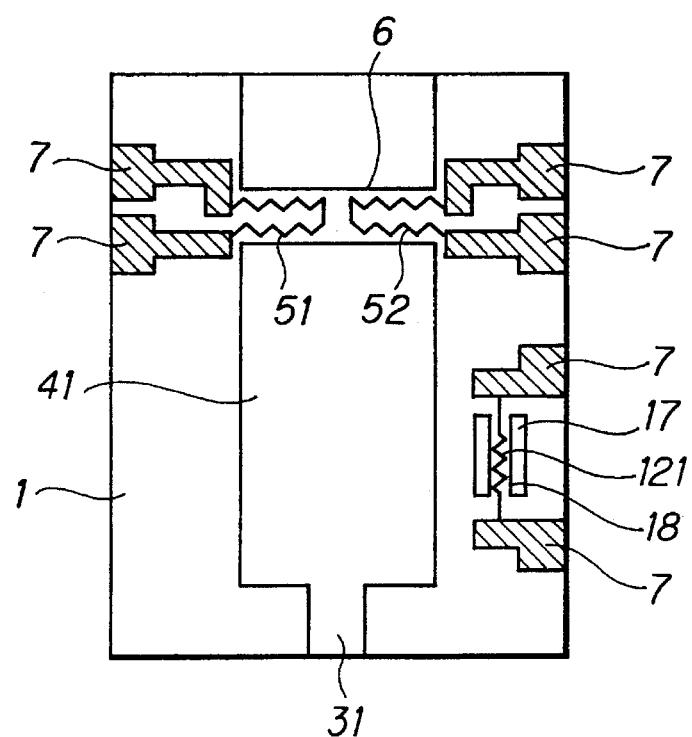
FIG. 2 is a plan view of a lower semiconductor substrate of the sensor body shown in FIG. 1.
Figure 3:
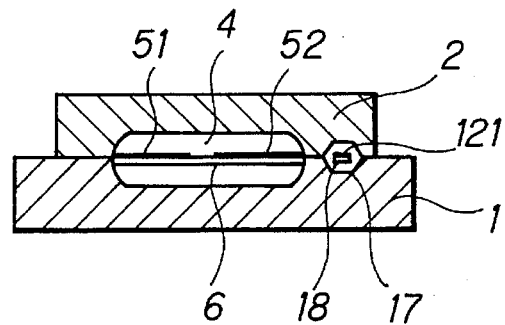
FIG. 3 is a front sectional view of the sensor body shown in FIG. 1.

FIGS. 1 to 3 shows a general construction of a miniature sensor body of a gas-flow type angular velocity sensor, which is manufactured by micro-machining on semiconductor substrates. The sensor body is constructed in such a way that a lower semiconductor substrate 1 having a half nozzle port 31 and a half groove 41 etched thereon and an upper semiconductor substrate 2 having a similar half nozzle port 31 and a similar half groove 41 etched thereon are bonded to each other so as to precisely couple the half ports 31 and the half grooves 41 to form a nozzle port 3 and a gas path 4 in the assembled body.

The lower semiconductor substrate 1 has a bridge portion 6 etched thereon with a pair of heat wires 51 and 52 formed on the bridge portion 6 by patterning. Electrode portions 7 are formed by patterning at both sides of the paired heat wires 51 and 52.

Figure 4:
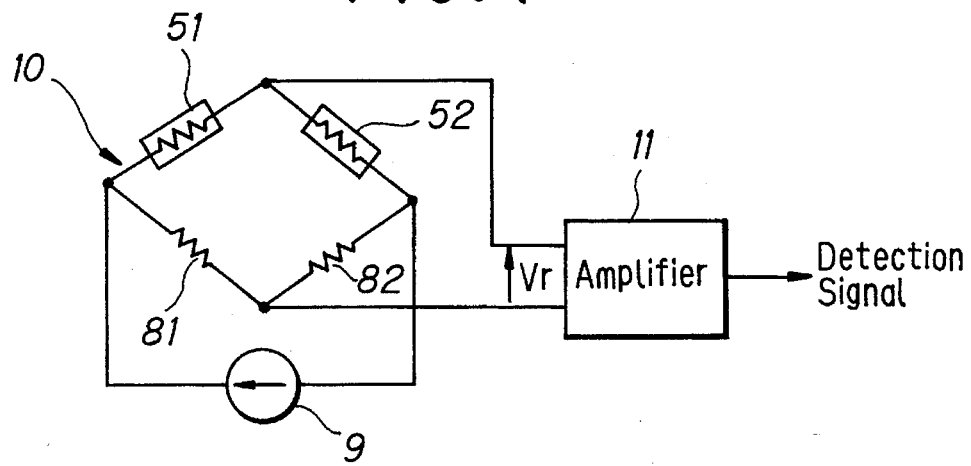
FIG. 4 is an electrical diagram showing a configuration of an angular velocity detecting circuit of the gas flow type angular velocity sensor.

FIG. 4 is illustrative of a configuration of an angular velocity detecting circuit of the gas flow type angular velocity sensor. This circuit comprises of an angular velocity detecting bridge circuit 10 which includes, in its arms, paired heat wires 51 and 52 arranged in the sensor body and paired cold wires 81 and 82 serving as reference resistance elements disposed outside the sensor body and which is provided with a power supply (constant current source) 9 and an amplifier 11 for amplifying an output voltage Vr of the bridge circuit 10.

The gas flow type sensor having a thus constructed sensor body can electrically detect a deflection of a laminar flow of inert gas (e.g., $N_2$ or Ar) constantly injected by a miniature pump (not shown) into the gas path 4 through the nozzle hole 3 and directed toward the paired heat wires 51 and 52 disposed therein. When the gas flow in the gas path 4 deflects to the left or the right by the action of an angular velocity applied to the sensor body, the paired heat wires 51 and 52 change their resistances and the bridge circuit 10 produces an unbalanced output corresponding to a differential change of thermosensitive outputs of the paired heat wires 51 and 52. This output is a detection signal of an angular velocity.

Figure 5:
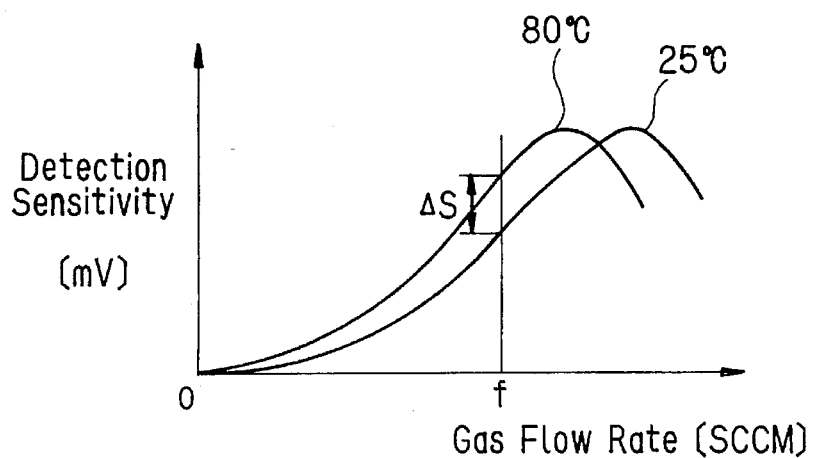
FIG. 5 is a graph showing an example of a sensitivity characteristic of an angular velocity sensor relative to a change in gas flow.

However, the sensor for detecting a deflection of a gas flow in its body by sensing a differential change of resistances of the paired heat wires 51 and 52 may change its sensitivity of angular velocity detection when the gas flow rate changes as shown in FIG. 5.

The sensitivity characteristic of the sensor relative to a change in the gas flow rate varies with a change in the working temperature. For instance, it varies by a value of $\Delta S$ (see FIG. 5) when the temperature of the gas flow at acting point "f" changes from 25° C. to 80° C.

Figure 6:
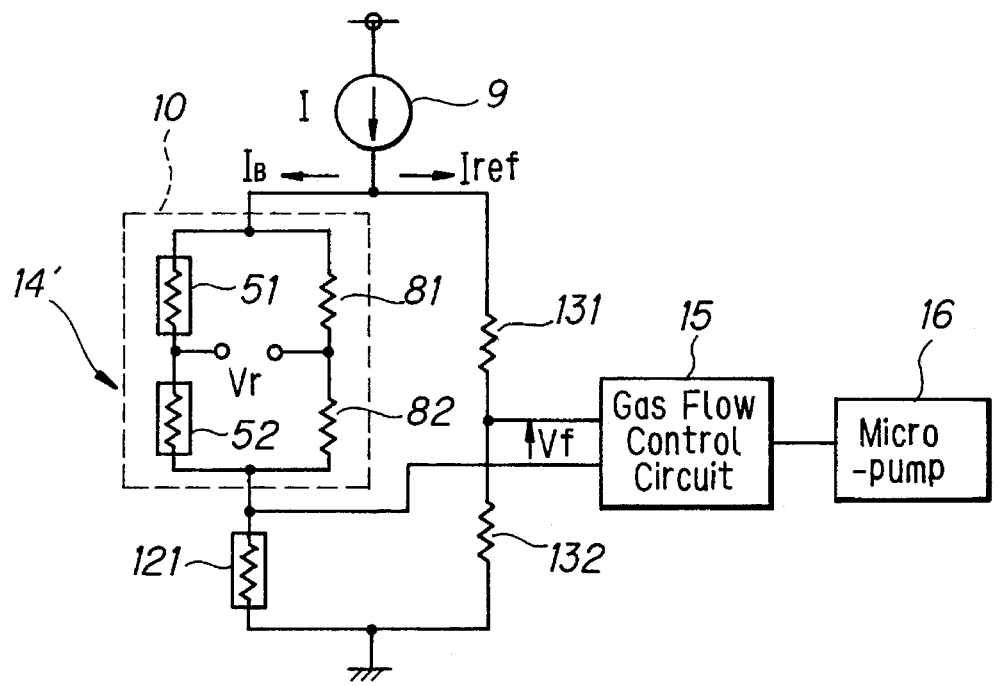
FIG. 6 is an electrical diagram showing a basic configuration of a circuit for gas flow control.
Figure 7:
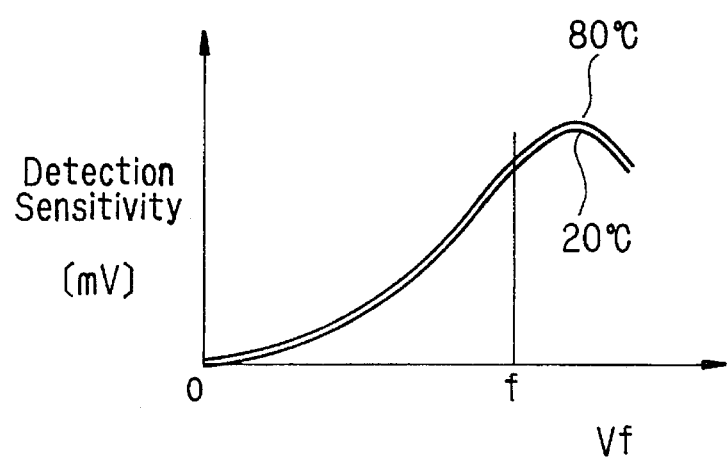
FIG. 7 is a graph showing another example of the sensitivity characteristic of an angular velocity sensor relative to an output of a bridge circuit for gas flow control.
Figure 8:
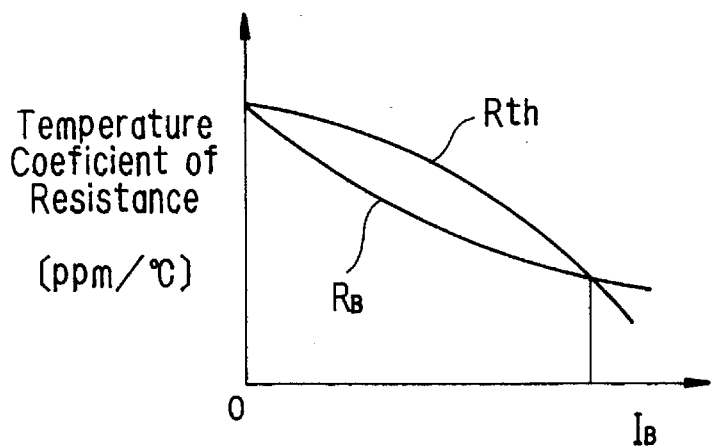
FIG. 8 is a graph showing an example of the temperature coefficient characteristic curves of a bridge resistance RB and a heat wire resistance Rth relative to a bridge circuit current IB in the circuit shown in FIG. 6.

The present invention, therefore, provides a temperature compensating heat wire 121 which is disposed at a place free from the affect of the gas flowing in the gas path 4 in the sensor body as shown in FIG. 2 and which is connected to a bridge circuit 10 in series with the power supply 9 thereof as shown in FIG. 6. Further, a circuit of series-connected cold heat wires (reference resistance elements) 131 and 132 and the bridge circuit provided with the series heat wire 121 are connected in parallel with each other to form a flowrate control circuit 14' of the double bridge type wherein the angular velocity detecting bridge circuit 10, the temperature compensating heat wire 121 and the cold wires 131 and 132 form respective arms of a bridge circuit. An output Vf of the flowrate control bridge-circuit 14' is transferred as a gas flowrate detection-signal to a gas flowrate control circuit 15 which according to the detection signal controls the drive of the miniature pump 16 for injecting the gas into the gas path 4 to maintain a constant gas flowrate in the gas path.

In the shown embodiment, the temperature compensating heat wire 121 is formed in the sensor body at a place where it can sense a temperature of the sensor without being affected by the gas flowing in the gas path 4, for example, on a bridge portion 18 formed across a groove 17 etched on a lower semiconductor substrate 1 as shown in FIG. 2.

In the normal case with the sensor body and the miniature pump placed in a container filled with pressure gas to circulate the gas through the sensor body by the pump, it is desirable to provide an opening through which the groove 17 communicates with the outside of the sensor body in order to keep the same pressure in the gas path and the groove 17.

In the flowrate control bridge-circuit 14', the angular velocity detecting bridge-circuit 10 is also used as a flow sensor. Accordingly, it is necessary to eliminate the possibility of changing the angular velocity detecting accuracy due to the effect of a temperature change, i.e., to match the temperature coefficient of a resultant resistance RB of the angular velocity detecting bridge-circuit 10 with that of resistance Rth of the temperature compensating heat wire 121 so that the sensitivity characteristic of the angular velocity sensor versus the output Vf of the flowrate control bridge-circuit 14' may not vary with a change of temperature and the constant detection accuracy can be maintained at the acting point "f" of the gas flow.

The resultant resistance RB of the angular velocity detecting bridge circuit 10 can be calculated according to the following equation:

$$RB = Rcw \cdot Rhw/(Rcw + Rhw) \tag{1}$$

where Rhw is the series resistance of heat wires 51 and 52 for detection of an angular velocity and Rcw is the series resistance of cold wires 81 and 82.

If the series resistance of cold wires 131 and 132 in the flowrate control bridge-circuit 14' is expressed as Rref, RB is much less than Rref (i.e. RB<<Rref). Consequently, in the current equation I=IB+Iref that flows through the flowrate control bridge circuit 14', there is a relation of IB>>Iref.

If the angular velocity detecting bridge-circuit 10 and the temperature compensating heat wire 121 are independent from each other in circuitry, the temperature coefficient of the heat wire 121 can be controlled by changing the current flowing through the heat wire 121 to attain a desired temperature.

In the case of the flowrate control bridge circuit 14' having the configuration shown in FIG. 6, the resultant resistance RB of the angular velocity detecting bridge-circuit 10 and the resistance Rth of the temperature compensating heat wire 121 have different temperature coefficients of resistance, which may cause a difference between temperature characteristics of the bridge circuit 10 and the heat wire 121 in relation to the current IB commonly flowing through them. This means that matching the temperature coefficients of the bridge circuit 10 and the heat wire 121 can be achieved only at a specified current value $I_{B1}$ at a point where their temperature characteristics meet with each other. If a gas flow type angular velocity sensor is designed according to a specified design value, it is impossible to control the sensitivity of the sensor by changing the current IB to be supplied to the angular velocity detecting bridge-circuit 10.

Figure 9:
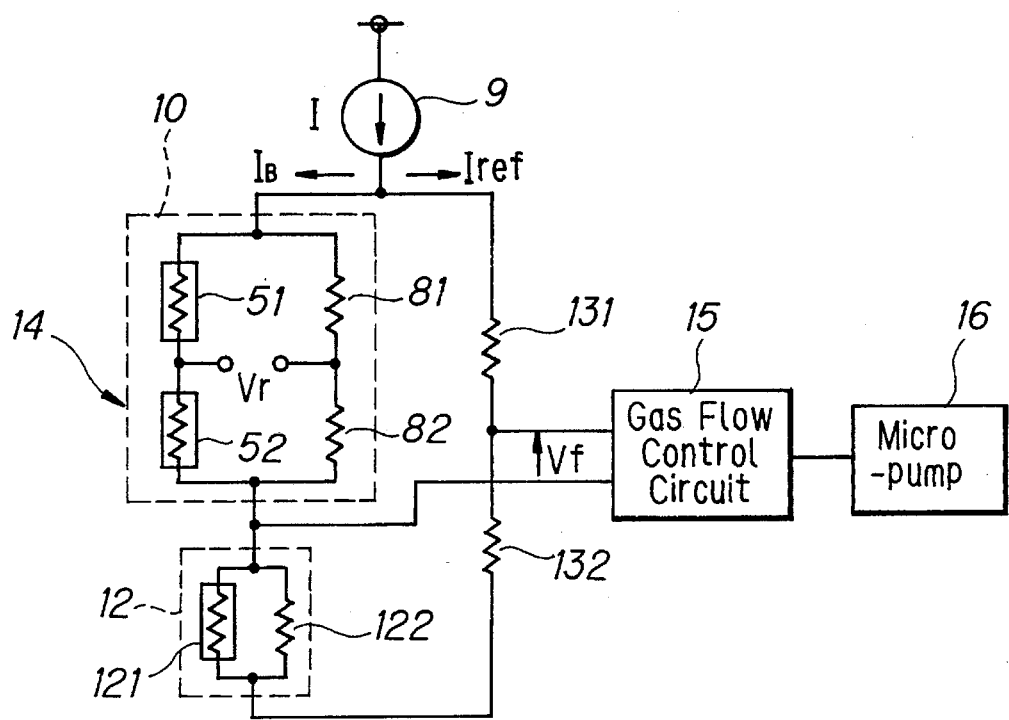
FIG. 9 is an electrical diagram showing a configuration of a gas flow control circuit portion according to the present invention.

Accordingly, the present invention also contemplated that the flowrate control bridge-circuit 14 is provided with a temperature compensating circuit 12 consisting of a cold wire (reference resistance element) 122 connected in parallel with the temperature compensating heat wire 121 as shown in FIG. 9. The cold wire 122 is formed of the same material (e.g., platinum) by the same process that the heat wire 121 is formed.

With the temperature compensating circuit 12 of the heat wire 121 and the cold wire 122 connected in parallel with each other, it is possible to set any desired temperature coefficient of resistance irrespective of the current supplied to the temperature compensating circuit 12 by selectively setting a resistance ratio between the heat wire 121 and the cold wire 122. The setting range runs from a temperature coefficient of resistance in the heat wire 121 at a current Ith flowing therein to a temperature coefficient of resistance in the cold wire 122.

Figure 10:
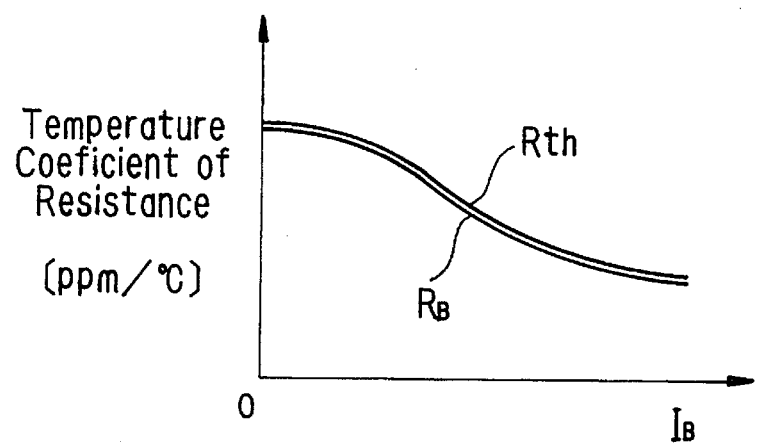
FIG. 10 is a graph showing an example of the temperature coefficient characteristics of a bridge circuit resistance RB and a temperature compensating circuit resistance relative to a bridge circuit current IB in the circuit shown in FIG. 9.

The temperature compensating circuit 12 has a configuration similar to the angular velocity detecting bridge-circuit 10 and, therefore, its temperature characteristic relative to the common current IB is similar to that of the angular velocity detecting bridge circuit 10 as shown in FIG. 10.

Accordingly, the temperature dependency of the output Vf of the flowrate control bridge-circuit 14 is eliminated and, thereby, the gas flow rate can be constantly controlled according to the output Vf irrespective of the sensor body temperature. The adjustment of the current IB for optimizing the sensitivity of the sensor can be achieved free from the temperature influence.

Figure 11:
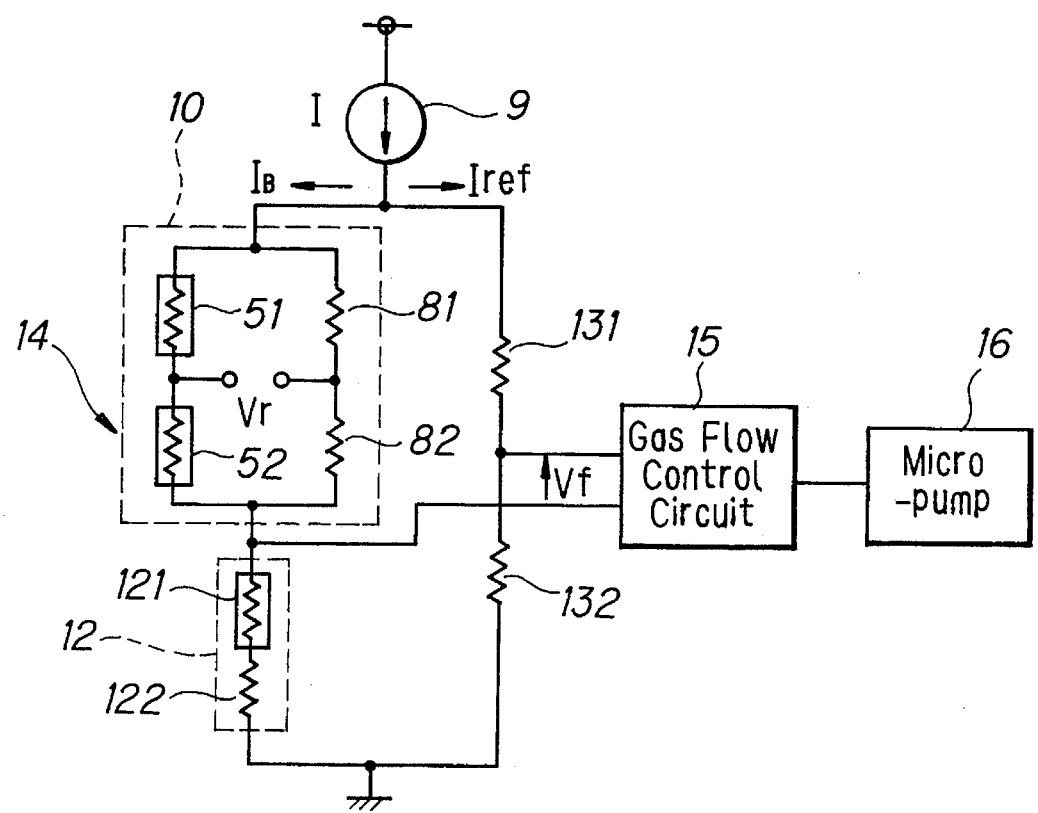
FIG. 11 is an electrical diagram showing another configuration of a gas flow control circuit portion according to the present invention.

While the preferred embodiment is described it is to be understood that the invention is not limited thereto but may be otherwise variously embodied. For instance, a temperature compensating circuit 12 may be adopted with the thermosensitive resistance elements 121 and 122 connected in series with each other, as shown in FIG. 11. The present invention can be applied to a sensor of the type which is intended to detect a change of heat distribution by the action of momentum, e.g., an acceleration acting on the sensor body by using a bridge circuit comprising a heat wire and a cold wire together with reference resistance elements.

It is also possible to construct a flowrate control bridge circuit 14 that is not of the double bridge type but rather with the angular velocity detecting circuit 10 and the temperature compensating circuit 12 connected in series and a reference voltage corresponding to a middle potential is applied to the connecting point of the circuits.

As is apparent from the foregoing description, the gas flow type angular velocity sensor according to the present invention is featured by its construction that an angular velocity detecting bridge-circuit provided with a temperature compensating circuit connected thereto in series with a constant current source and a circuit of a pair of reference resistance elements connected in series are connected in parallel with each other to form a double bridge type flowrate control bridge-circuit which has, in its arms, the angular velocity detecting bridge circuit, the temperature compensating circuit and the paired reference resistance elements, and said temperature compensating circuit is composed of a thermosensitive resistance element and a reference resistance connected in parallel thereto and disposed outside of the gas path, thereby allowing paired heat wires for sensing an angular velocity to work as a flow sensor (without using an additional flow sensor in the sensor body) with temperature compensation. Accordingly, the flow rate of gas in the gas path can be accurately controlled with stable temperature compensation optimally stabilize the sensitivity of the angular velocity sensor.

What is claimed is:

1. A gas flow angular velocity sensor for sensing an angular velocity acting on a sensor body of the sensor, comprising (a) a control bridge circuit (14) for detecting gas flow to be controlled by an unbalanced output of an angular velocity detecting bridge circuit (10) and (b) a gas flow control circuit (15) for controlling drive of a pump to maintain a constant flow rate of gas, the angular velocity detecting bridge circuit having paired primary thermosensitive resistance elements (51,52) disposed as arms on opposite sides of the angular velocity detecting bridge circuit in a gas path through the sensor body and paired primary reference resistance elements (81, 82) disposed outside of the gas path, said output appearing when resistances of the paired primary thermosensitive resistance elements (51, 52) change when a flow of gas directed toward said paired primary thermosensitive resistance elements (51, 52) deflects by action of the angular velocity on the sensor body, wherein a temperature compensating circuit (12) is connected to the angular velocity detecting bridge circuit (10) in series with a power supply of the control bridge circuit and said temperature compensating circuit comprises a secondary thermosensitive resistance element (121) and a secondary reference resistance element (122).

2. A sensor according to claim 1 wherein said secondary thermosensitive resistance element and said secondary reference resistance element are connected in series.

3. A sensor according to claim 1 wherein said secondary thermosensitive resistance element and said secondary reference resistance element are connected in parallel.

4. A gas flow angular velocity sensor for sensing an angular velocity, comprising a sensor body;

a miniature pump for circulating gas through the sensor body;

a gas flow control circuit coupled to the miniature pump for controlling drive of the pump to maintain a constant flow rate of gas;

a control bridge circuit including (a) a power supply and (b) an angular velocity detecting bridge circuit having (i) paired primary thermosensitive resistance elements disposed as arms on opposite sides of the angular velocity detecting bridge circuit in a gas path through the sensor body and (ii) paired primary reference resistance elements disposed outside of the gas path, the control bridge circuit detecting gas flow to be controlled by an unbalanced output of the angular velocity detecting bridge circuit, said output appearing when resistances of the paired primary thermosensitive resistance elements change when a flow of gas directed toward said paired primary thermosensitive resistance elements deflects by action of angular velocity on the sensor body; and a temperature compensating circuit connected to the angular velocity detecting bridge circuit in series with the power supply, said temperature compensating circuit comprising a secondary thermosensitive resistance element and a secondary reference resistance element.

5. A sensor according to claim 4 wherein said secondary thermosensitive resistance element and said secondary reference resistance element are connected in series.

6. A sensor according to claim 4 wherein said secondary thermosensitive resistance element and said secondary reference resistance element are connected in parallel.

* * * * *